United States Patent [19]
Weiss et al.

[11] Patent Number: 4,776,154
[45] Date of Patent: Oct. 11, 1988

[54] STONE DETECTOR FOR FIELD CHOPPER

[75] Inventors: Burkhard Weiss, Weigsdorf-Köblitz; Arthur Hauschild, Sebnitz; Erich Herrmann, Polenz, all of German Democratic Rep.

[73] Assignee: VEB Kombinat Fortschritt - Landmaschinen, Neustadt/Sachsen, Fed. Rep. of Germany

[21] Appl. No.: 914,633

[22] Filed: Oct. 2, 1986

[30] Foreign Application Priority Data
Oct. 4, 1985 [DD] German Democratic Rep. ... 281454

[51] Int. Cl.$^4$ .................. A01D 75/18; A01F 29/16
[52] U.S. Cl. .................. 56/10.2; 56/DIG. 15
[58] Field of Search .................. 56/10.2, DIG. 15

[56] References Cited
U.S. PATENT DOCUMENTS

| | | | |
|---|---|---|---|
| 3,896,608 | 7/1975 | Garrott | 56/10.2 |
| 4,261,161 | 4/1981 | Colgrove et al. | 56/10.2 |
| 4,296,591 | 10/1981 | Martenas et al. | 56/10.3 |
| 4,322,937 | 4/1982 | Hollmann | 56/10.2 |
| 4,344,074 | 8/1982 | Strosser et al. | 56/10.2 |
| 4,433,528 | 2/1984 | Bohman | 56/10.2 |
| 4,531,118 | 7/1985 | Beams | 56/10.2 |

Primary Examiner—Paul J. Hirsch
Attorney, Agent, or Firm—Herbert Dubno

[57] ABSTRACT

An agricultural machine has a machine frame adapted to move along the ground in a normal travel direction, a crop cutter on the front of the frame, and a crop comminuter carried on the frame behind the cutter. An intake device including a generally fixed feed element on the frame and another feed element displaceable on the frame toward and away from the fixed feed element is operated by a stoppable drive connected to the fixed feed element to feed the cut crop as a stream back in the transport direction to the comminuter. The displaceable element compacts the stream of cut crop against the fixed feed element. An accelerometer is connected between the displaceable feed element and the frame for joint displacement with the displaceable feed element and generates an output corresponding to acceleration of the displaceable feed element toward and away from the fixed element. The machine may also have an alarm. A controller connected between the accelerometer and the drive and/or the alarm stops the feed and/or sounds the alarm when the output exceeds a predetermined limit indicating presence of a massive object between the elements.

7 Claims, 1 Drawing Sheet

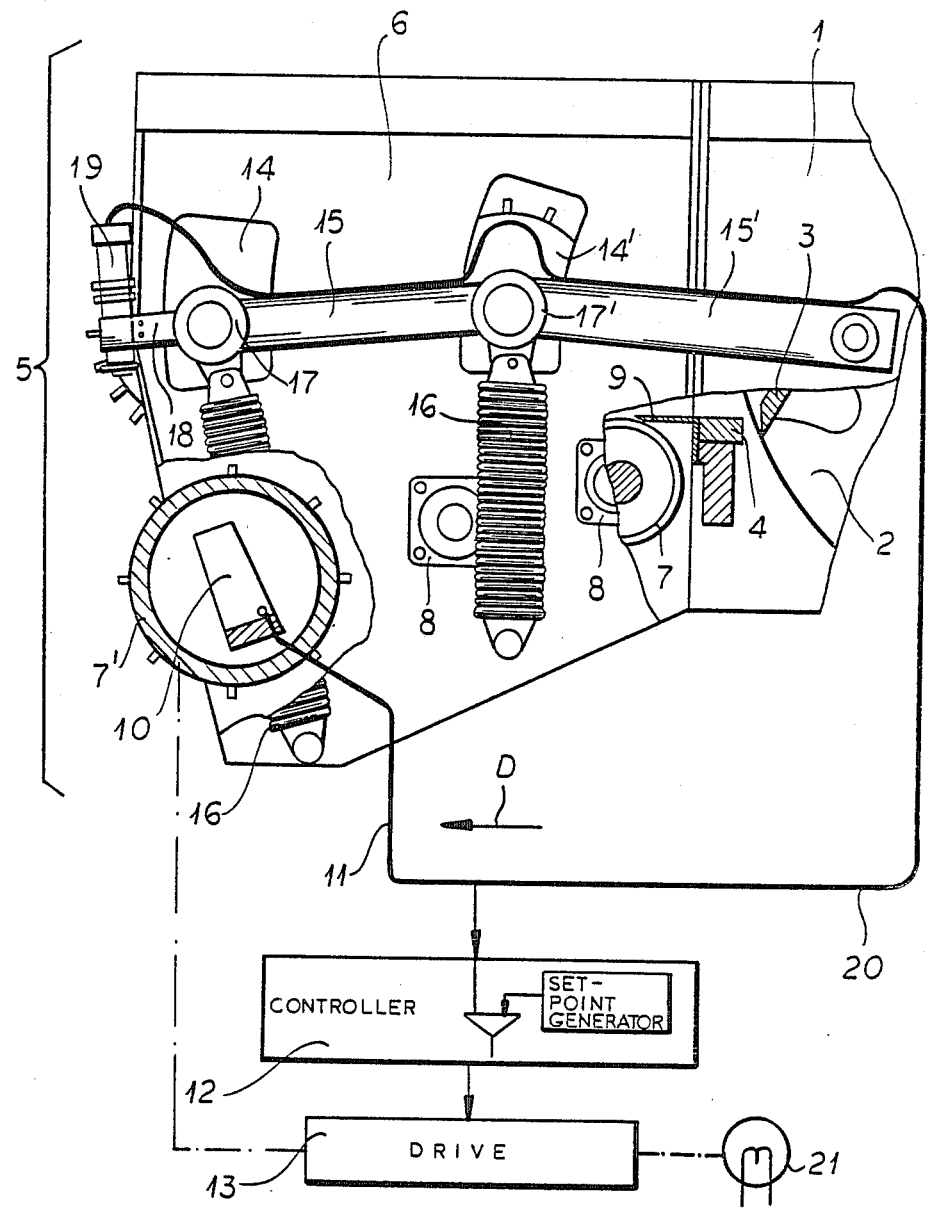

STONE DETECTOR FOR FIELD CHOPPER

CROSS REFERENCE TO RELATED APPLICATION

This application is related to jointly filed application Ser. No. 914,634, now U.S. Pat. No. 4,720,963 issued Jan. 26, 1988.

FIELD OF THE INVENTION

The present invention relates to a system for detecting hard foreign bodies in the intake of an agricultural machine like a mower or field chopper. More particularly this invention concerns a device for detecting stones in this intake.

BACKGROUND OF THE INVENTION

A field chopper, mower, threshing machine, or the like normally has a frame that moves along the ground and that has a front end provided with a device for cutting the crop—corn, alfalfa, grass—at the base. An intake conveyor receives the crop from the cutter and compacts it into a stream which it transports back from the front-end cutter to a blade-carrying drum comminuter which rotates to chop the cut crop. This comminuter or chopper can be seriously damaged if a hard object like a stone, a piece of fencing, or the like is fed by the intake conveyor to it. However, since such a machine is normally being moved through a standing crop that effectively obscures what is directly in front of it, it is very difficult for the operator of the apparatus to see what is being cut and taken in. Thus recourse must be had to automatic detectors.

The detecton of magnetizable or magnetically attractable objects is a relatively simple task. It can be done as described in U.S. Pat. No. 3,757,501, German Pat. No. 2,552,805 (filed by W. Garott with a claim to a priority of Dec. 4, 1974 of U.S. patent application Ser. No. 529,305), and East German Pat. No. 111,534 issued Feb. 20, 1975 to K. Wehsely by making the incoming crop stream pass through a magnetic field. When a potentially dangerous magnetizable object is detected an alarm is issued and/or the intake device and/or comminuter are stopped so that the object can be removed from the machine. The main disadvantage of such a system is that stones or similar solid objects do not have magnetic properties to make them detectable by such equipment. Objects like stones, blocks of wood, bones, or aluminum fencing can do as much harm as magnetizable objects and are just as likely to be encountered when harvesting. In addition when a piece of steel fence wire or the like is in the incoming crop stream it can get wound into the crop stream so is not easily detected by the field, particularly when generated by a plurality of independent coils as in above-cited patent No. 111,534.

Another system is described in East German Pat. Nos. 117,030 and 120,782 both of K. Wehsely. In these arrangements a pusher roller presses the stream of crop down against the conveyor and has at least two relatively displaceable portions. Since the crop is typically fairly soft, at least compared to the hard objects that should be detected by the device, the backwardly flowing cut-crop stream will be crushed and the two portions of the pusher-down roller will not move appreciably relative to each other. When, however, a stone or the like is pinched between one of the roller portions and the conveyor, this portion will be shifted relative to the other portion, typically by pivoting aboout an eccentric but parallel axis. Position-sensing mechanism will detect this relative movement and generate an error signal that will cause the controller to issue a warning and/or stop the machine. Such an arrangement does not work when the object being sensed strikes several portions, as it is relative movement of adjacent portions that is sensed. Furthermore an object imbedded in the crop will frequently also be missed as in most of the prior-art systems.

A further system is described in West German Pat. No. 3,213,713 (filed by W. Raeck with a claim to a priority of Apr. 15, 1981 of U.S. patent application Ser. No. 254,319) where the pusher roller is hollow and is provided internally with transducers which detect the characteristic ping made when a stone or similar hard object strikes this metallic pusher roller. For this system to work this pusher roller must be mounted so that it is insulated from the normal considerable vibration and noise produced during operation of the harvester. In addition the electrical signals produced by the crystal microphones used as transducers must be transmitted through trouble-prone commutator rings to the controller so that these signals can be analyzed and the machine shut down when a hard object is heard striking the pusher roller. Not only is such a device quite complex and, hence, expensive, but it also does not respond when a sufficient layer of soft material comes between the pusher roller and the conveyor, as this masks the sound made by the hard object.

OBJECTS OF THE INVENTION

It is therefore an object of the present invention to provide an improved apparatus for detecting hard objects in the intake of an agricultural machine.

Another object is the provision of such an apparatus which is simple in construction, yet which surely and accurately detects hard objects, whether magnetically detectable or not, even when they are imbedded in a rapidly moving stream of cut crop.

SUMMARY OF THE INVENTION

An agricultural machine according to the invention has a machine frame adapted to move along the ground in a normal travel direction, a crop cutter on the front of the frame, and a crop comminuter carried on the frame behind the cutter. An intake device including a generally fixed feed element on the frame and another feed element displaceable on the frame toward and away from the fixed feed element is operated by a stoppable drive connected to the fixed feed element to feed the cut crop as a stream back in the transport direction to the comminuter. The displaceable element compacts the stream of cut crop against the fixed feed element. According to the invention an accelerometer is connected between the displaceable feed element and the frame for joint displacement with the displaceable feed element and generates an output corresponding to accelerating of the displaceable feed element toward and away from the fixed element. The machine may also have an alarm. A controller connected between the accelerometer and the drive and/or the alarm stops the feed and/or sounds the alarm when the output exceeds a predetermined limit indicating presence of a massive object between the elements.

Thus during the normal course of events the displaceable pusher element moves toward and away from the fixed but rotatable element as the passing stream of cut crop grows thicker and thinner. This variation does not however produce enough acceleration to pass the threshold as the incoming crop stream is crudely regular. When, however, a hard object like a stone comes between the two feed elements, even if it contacts neither of them directly, this suddenly appearing lump in the crop stream will cause the pusher feed element to move suddenly away from the fixed feed element, and the accelerometer will generate an output exceeding the limit s that this object is detected. Furthermore the accelerometer will respond again when, as is standard, the displaceable element is pressed toward the fixed element, the accelerometer moves rapidly in behind a lump formed in the stream by a hard foreign object. Thus, each such stone will be detected coming and going as it passes the displaceable feed element, so that the chances that it be missed will be halved.

According to another feature of this invention the intake device is provided with an electromagnetic detector that senses the presence of an object of magnetically attractable material adjacent the elements. This detector is also connected to the controller for stopping the intake device and/or issuing a warning when such magnetizable material is detected. Combining magnetic and physical detection is extremely advantageous, as small ferrous objects (e.g. nails) are fairly common and very hard on the comminuter, so that their detection with great sensitivity is highly advantageous. On the other hand any solid object of above a certain size is fairly certain to be bad for the comminuter, even a simple block of wood, so that a purely size- and hardness-related screening combined with the electromagnetic one will eliminate virtually anything that could hurt a chopper drum or the like.

An accelerometer is a standard industry item that is, for instance, constituted by a magnetic object suspended between two springs compressible in the direction acceleration is to be sensed in and surrounded by a coil. As the body moves in the coil with compression of one spring and extension of the other it will generate a voltage in the coil which is directly proportional to its speed. The actual position will be irrelevant and slow changes in position will be represented by low voltages and high-speed changes by higher voltages.

Normally, according to this invention, the output of the accelerometer is compared as an actual-value signal with a set point. This comparison can take place directly in the accelerometer so that only signals corresponding to detection of hard objects are sent on to the controller, or it can be done in the controller. The latter solution makes it possible to set the response threshold relatively easily and in fact to continuously monitor and read out the action of the displaceable element, although of course the acceleration will not be related to the thickness of the incoming stream of cut crop, merely to the abruptness of changes in this thickness.

The fixed element according to this invention is normally a roller rotatable on the frame about an axis fixed relative to the frame. It can also be a conveyor belt. Similarly the displaceable element is another roller rotatable about an axis movable on the frame toward and away from the fixed axis. The frame is provided with a support pivotal about a support axis parallel to the fixed axis and having an outer end carrying the displaceable element. In machines with an angled conveyor, such as mowing machines, the displaceable feed element connected to the accelerometer can be a simple sensing arm or roller having little or no actual conveying function.

DESCRIPTION OF THE DRAWING

The above and other features and advantages will become more readily apparent from the following, reference being made to the accompanying drawing whose sole FIGURE is a largely schematic view of a detail of a field chopper equipped with an apparatus for detecting hard foreign bodies according to this invention.

SPECIFIC DESCRIPTION

As seen in the drawing a field chopper has a frame 1 adapted to travel along the ground in a horizontal travel direction D and carrying a main copping drum 2 having blades 3 that are orbited about a horizontal axis fixed on the frame 1 and extending perpendicular to the direction D past a stationary anvil blade 8. A not illustrated cutter on the front end 6 of the frame 1 delivers cut crop to an upstream or forward large-diameter conveyor roller 7' followed by two smaller conveyor rollers 7 (only one shown in part) supported on the frame 1 on bearings 8 for rotation about respective horizontal and parallel axes also extending perpendicular to the direction D. A drive 13 operated by a controller 12 rotates all of the rollers 7 and 7'. This drive 13 can be formed by a transmission and clutch connected in series between the rollers 7 and 7' on the one side and the engine of the machine on the other.

Two rollers 14 and 14' are carried on bearings 17 and 17' on arms 15 and 15' for free rotation about axes above and parallel to those of the rollers 7' and 7. The arms 15' both extend in the direction D and have rear ends pivoted on the frame 1 about a horizontal axis perpendicular to the direction D and front ends pivotally carrying the rear pusher roller 14' which is formed, like the rollers 7, 7', and 14 of a cylindrical drum with radial spikes or ridges. The arms 15 in turn extend from the front ends of the arms 15' to the bearings 17. Respective springs 16 and 16' push the rollers 14 and 14' downward, toward the rollers 7' and 7 so as to compact and compress the stream of crop moving back opposite to the direction D to an intake plate 9 of the cutter drum 2.

In accordance with the invention an accelerometer 19 is connected between an extension 18 at the front outer end of the arms 17 and a stationary part of the frame 1 and is connected via a wire 20 to the controller 12. This accelerometer 18 generates a voltage output proportional to the acceleration of the rollers 14 and 14' toward and away from the rollers 7' and 7. This actual-value signal is matched in the controller 12 with a signal from a set-point generator and, when the actual value exceeds the set point, a signal is issued to the drive 13 to stop the rollers 7' and 7 and to a warning lamp 21 to stop the conveyor and warn the operator of the piece of equipment.

As described above, during the normal operation of the device the rollers 14 compress the stream of cut crop coming back from the cutter and move up and down as this crop stream gets thicker and thinner, as it inevitably does in a fairly random manner. When, however, a hard object such as a stone or a block of wood gets into the stream, the rollers 14 and 14' are suddenly pushed upward and then drop suddenly back down, accelerating rapidly for both movements. Such sudden acceleration only occurs when a fairly solid lump is present in the crop stream, as the crop itself is fairly soft and is generally uniform. Thus this system detects the presence of a hard foreign body with great accuracy.

In addition the frontmost conveyor roller 7' is provided internally with an electromagnetic detector 10 connected like the accelerometer 19 via a line 11 to the controller 12. When an iron or other magnetically detectable object is sensed by the detector 10 the warning is issued and the drive 13 is stopped, the same as if a rock is detected by the accelerometer.

We claim:

1. An agricultural machine comprising:
   a machine frame adapted to move along the ground in a normal travel direction;
   a crop comminuter carried on the frame;
   an intake device including
     a generally fixed feed element on the frame;
     another feed element displaceable on the frame toward and away from the fixed feed element, whereby the displaceable element normally presses cut crop against the fixed feed element;
     stoppable drive means connected to the fixed feed element for normally operating same to feed cut crop back in the transport direction to the comminuter;
   an accelerometer connected to the displaceable feed element for joint displacement therewith and for generating an output corresponding to acceleration of the displaceable feed element toward and away from the fixed element; and
   control means connected between the accelerometer and the drive means for stopping the operation of the displaceable feed element and thereby stopping feeding of crop to the comminuter when the output exceeds a predetermined limit indicating presence of a massive object between the elements.

2. The agricultural machine defined in claim 1 wherein the intake device is provided with means for electromagnetically detecting the presence of an object of magnetically attractable material adjacent the elements and also connected to the control means for stopping the intake device when such magnetizable material is detected.

3. The agricultural machine defined in claim 1 wherein the fixed element is a roller rotatable on the frame about an axis fixed relative to the frame.

4. The agricultural machine defined in claim 3 wherein the displaceable element is another roller rotatable about an axis movable on the frame toward and away from the fixed axis.

5. The agricultural machine defined in claim 4 wherein the frame is provided with a support pivotal about a support axis parallel to the fixed axis and having an outer end carrying the displaceable element.

6. The agricultural machine defined in claim 5, further comprising
   biasing means connected between the support and the frame for pivotally urging the displaceable element toward the fixed element.

7. An agricultural maching comprising:
   a machine frame adapted to move along the ground in a normal travel direction;
   a comminuter carried on the frame;
   an intake device including
     a generally fixed feed element on the frame;
     another feed element displaceable on the frame toward and away from the fixed feed element, whereby the displaceable element normally presses cut crop against the fixed feed element;
     stoppable drive means connected to the fixed feed element for normally operating same to feed cut crop back in the transport direction to the comminuter;
   an accelerometer connected to the displaceable feed element for joint displacement therewith and for generating an output corresponding to acceleration of the displaceable feed element toward and away from the fixed element;
   an alarm; and
   control means connected between the accelerometer and the alarm for operating same when the output exceeds a predetermined limit indicating presence of a massive object between the elements.

* * * * *